J. W. Ricker,
Well Tubing.
N° 70,617.   Patented Nov. 5, 1867.
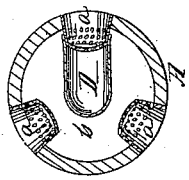
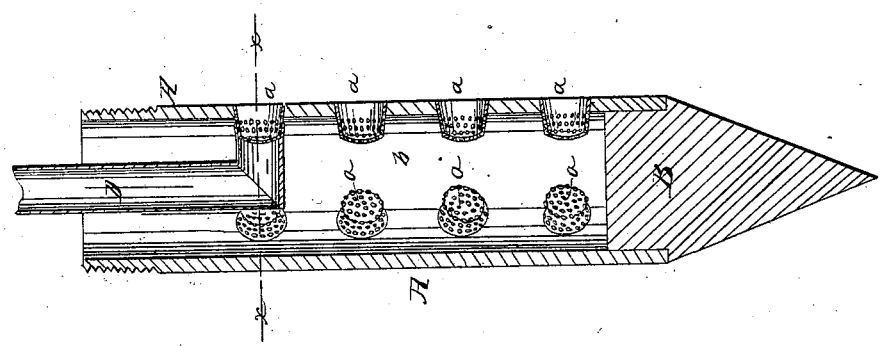
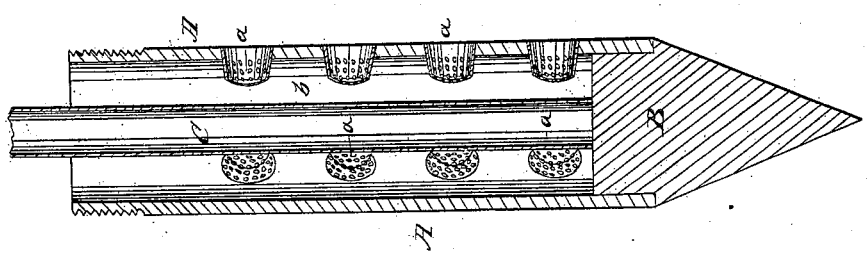
Witnesses
N. W. Stearns
Inventor:
John W. Ricker

United States Patent Office.

JOHN W. RICKER, OF CHELSEA, MASSACHUSETTS.

Letters Patent No. 70,617, dated November 5, 1867.

---

IMPROVEMENT IN WELL-TUBES.

---

The Schedule referred to in these Letters Patent and making part of the same.

---

TO ALL WHOM IT MAY CONCERN:

Be it known that I, JOHN W. RICKER, of Chelsea, in the county of Suffolk, and State of Massachusetts, have invented certain Improvements in Well-Tubes, of which the following is a full, clear, and exact description, reference being had to the accompanying drawings, making part of this specification, in which Figures 1 and 2 are vertical sections through a well-tube, with my improvements applied thereto.

Figure 3 is a horizontal section on the line $x\ x$ of fig. 2.

My present invention relates particularly to certain improvements in well-tubes for which Letters Patent of the United States were granted to Tristram S. Lewis on the seventh day of May, A. D. 1867.

The object of his said improvements was to prevent the passage of sand, clay, etc., to the interior of the well-tube by providing its lower end with one or more short perforated tubes, which passed horizontally or in an inclined direction through it, the short perforated tubes being filled with a substance soluble in water to endeavor to prevent the entrance of the sand, etc., while the tube was being forced down, after which the soluble substance was to be dissolved by pouring hot water down the tube to allow of the unobstructed flow of water thereto. This method failed to accomplish the desired result, as the soluble substance was forced in (as the tube was going down) by the sand, which was then free to enter and closely pack itself around the perforated tubes, which the application of hot water failed to remove.

My invention consists in providing the lower end of the well-tube with a series of perforated conical thimbles, which project but a short distance within the well-tube, leaving an opening in its centre to allow of a tube of small diameter to be dropped therein upon the sand which may have entered, a pump being employed to force a column of water down the inner tube, and, by its pressure or action upon the sand, stir up or agitate it, so that it will gradually mix with the water forced in, and flow out at the top, when, by employing a tube provided with a shoulder fitting over the inner ends of the thimbles, and continuing the pressure, the sand contained within them is soon ejected therefrom, the conical or tapering form outward serving to facilitate the egress of the sand.

To enable others skilled in the art to understand and use my invention, I will proceed to describe the manner in which I have carried it out.

In the said drawings, A is the lower end of a well-tube, the several sections of which are provided with screw-threads to connect them together in a well-known manner. Secured to the bottom of the portion A is a shoe, B, of a conical or other form best adapted for entering the ground to be bored. $a\ a$ are a series of perforated conical thimbles, the outer ends of which are soldered, or otherwise secured, to the shell of the portion A, while their inner ends project a short distance horizontally into its interior, sufficient room being left at its centre to form an open passage, $b$, for the introduction of a tube, C, of small diameter (see fig. 1) for a purpose now to be described.

When the well-tube is being forced down, the clay or sand contained in the ground surrounding it is pressed, through the perforations in the conical thimbles, into the interior of the portion A of the main or well-tube, and forms a compact mass, which can only be removed by forcing water down the tube C, which is inserted at the top of the well-tube, and rests upon the sand within it, a force-pump being connected with the upper end of the tube C, by which means the sand, clay, etc., is loosened and stirred up so as to mix with the water, and flow out of the top of the main tube, after which the tube C is withdrawn, and a tube, D, bent at its lower end, is fitted over the inner ends of the thimbles, as seen in fig. 2, and, the water continuing to be forced down, the contents of the thimbles are gradually softened and expelled therefrom, the pressure acting through the perforations at the inner ends, as well as the sides, of the thimbles, the form of which, being conical and diverging outward, serves greatly to facilitate their being discharged, when the water from the surrounding ground will flow unobstructedly into the main tube, and the tube D, with its force-pump, may be removed therefrom.

The soluble substance placed in the perforated tubes as constructed by the aforesaid Tristram S. Lewis was forced in before the well-tube was driven down the required depth, and the surrounding soil passed through the perforations into the interior of the well-tube, and, owing to the position of the perforated tubes therein, no space was left in the centre of the well-tube to allow of the means I employ for removing the sand, etc., there collected.

It will be seen by my improvements that no soluble substance is required to close the perforated thimbles, the sand, etc., being readily removed therefrom by the application of hydraulic pressure, in the manner set forth.

*Claim.*

What I claim as my invention, and desire to secure by Letters Patent, is—

A series of perforated conical-shaped thimbles $a$, applied to a well-tube, constructed and operated substantially as and for the purpose described.

I also claim a well-tube provided with a series of perforated conical-shaped thimbles $a$, from which the sand is ejected by the employment of tubes C D, substantially in the manner set forth.

JOHN W. RICKER.

Witnesses:
    P. E. TESCHEMACHER,
    N. W. STEARNS.